US009360190B1

(12) United States Patent
Shum et al.

(10) Patent No.: US 9,360,190 B1
(45) Date of Patent: Jun. 7, 2016

(54) COMPACT LENS FOR HIGH INTENSITY LIGHT SOURCE

(71) Applicant: SORAA, INC., Fremont, CA (US)

(72) Inventors: Frank Tin Chung Shum, Fremont, CA (US); Michael Ragan Krames, Fremont, CA (US)

(73) Assignee: Soraa, Inc., Fremont, CA (US)

( * ) Notice: Subject to any disclaimer, the term of this patent is extended or adjusted under 35 U.S.C. 154(b) by 290 days.

(21) Appl. No.: 13/894,203

(22) Filed: May 14, 2013

Related U.S. Application Data

(63) Continuation-in-part of application No. 13/865,760, filed on Apr. 18, 2013.

(60) Provisional application No. 61/707,757, filed on Sep. 28, 2012, provisional application No. 61/646,766, filed on May 14, 2012.

(51) Int. Cl.
*F21V 13/00* (2006.01)
*F21V 13/04* (2006.01)
*F21V 29/00* (2015.01)

(52) U.S. Cl.
CPC ............ *F21V 13/04* (2013.01); *F21V 29/2206* (2013.01)

(58) Field of Classification Search
CPC .................................. F21V 5/04; F21V 3/04
See application file for complete search history.

(56) References Cited

U.S. PATENT DOCUMENTS

| 2,953,970 | A | 9/1960 | Maynard |
| 3,283,143 | A | 11/1966 | Gosnell |
| 3,593,021 | A | 7/1971 | Auerbach |
| 3,621,233 | A | 11/1971 | Harry et al. |
| 3,874,443 | A | 4/1975 | Bayer, Jr. |
| 4,165,919 | A | 8/1979 | Little |
| 4,225,904 | A | 9/1980 | Linder |
| 4,279,463 | A | 7/1981 | Little |
| 4,293,892 | A | 10/1981 | Plummer |
| 5,005,109 | A | 4/1991 | Carleton |
| 5,764,674 | A | 6/1998 | Hibbs-Brenner et al. |
| 6,116,758 | A | 9/2000 | Lin |
| 6,204,602 | B1 | 3/2001 | Yang et al. |
| 6,501,154 | B2 | 12/2002 | Morita et al. |
| D471,881 | S | 3/2003 | Hegde |
| 6,547,423 | B2 * | 4/2003 | Marshall ............ F21V 5/04 257/E33.072 |
| 6,787,999 | B2 | 9/2004 | Stimac et al. |
| 6,864,572 | B2 | 3/2005 | Lee et al. |
| 6,889,006 | B2 | 5/2005 | Kobayashi |

(Continued)

FOREIGN PATENT DOCUMENTS

CN 1849707 10/2006
CN 2826150 Y 10/2006

(Continued)

OTHER PUBLICATIONS

Communication from the Chinese Patent Office re 2011800543977 dated Jan. 7, 2015 (13 pages).

(Continued)

*Primary Examiner* — Elmito Breval
(74) *Attorney, Agent, or Firm* — Saul Ewing LLP

(57) ABSTRACT

The present invention relates to a compact optic lens for a high intensity light source having improved output beam characteristics. The compact optic lens provides increased light output without increasing device cost or device size to enable coverage of many beam angles.

15 Claims, 13 Drawing Sheets

CROSS-SECTION AA

(56) References Cited

U.S. PATENT DOCUMENTS

| | | |
|---|---|---|
| 6,942,368 B1 | 9/2005 | Kane et al. |
| 6,964,877 B2 | 11/2005 | Chen et al. |
| 7,207,694 B1 | 4/2007 | Petrick |
| D545,457 S | 6/2007 | Chen |
| 7,311,417 B1 | 12/2007 | Lemke |
| 7,344,279 B2 | 3/2008 | Mueller et al. |
| 7,388,751 B2 | 6/2008 | Hood et al. |
| 7,431,071 B2 | 10/2008 | Wenger |
| D581,583 S | 11/2008 | Peng |
| 7,458,706 B1 | 12/2008 | Liu et al. |
| 7,488,097 B2 | 2/2009 | Reisenauer et al. |
| 7,506,998 B2 | 3/2009 | Ansems et al. |
| D592,613 S | 5/2009 | Plonski et al. |
| 7,631,987 B2 | 12/2009 | Wei |
| 7,637,635 B2 | 12/2009 | Xiao et al. |
| 7,658,528 B2 | 2/2010 | Hoelen et al. |
| 7,663,229 B2 | 2/2010 | Lu et al. |
| 7,674,015 B2 | 3/2010 | Chien |
| 7,712,922 B2 | 5/2010 | Hacker et al. |
| D618,634 S | 6/2010 | Lin et al. |
| 7,744,259 B2 | 6/2010 | Walczak et al. |
| D619,551 S | 7/2010 | Lin et al. |
| 7,748,870 B2 | 7/2010 | Chang et al. |
| 7,753,107 B2 | 7/2010 | Zhou et al. |
| 7,800,119 B2 | 9/2010 | He et al. |
| 7,824,075 B2 | 11/2010 | Maxik |
| 7,824,077 B2 | 11/2010 | Chen et al. |
| 7,889,421 B2 | 2/2011 | Narendran et al. |
| 7,972,040 B2 | 7/2011 | Li et al. |
| 7,993,025 B2 | 8/2011 | Chiu |
| 7,993,031 B2 | 8/2011 | Grajcar |
| 7,997,774 B2 | 8/2011 | Liddle |
| 8,042,969 B2 | 10/2011 | Paik et al. |
| 8,049,122 B2 | 11/2011 | Watford |
| D652,564 S | 1/2012 | Maxik |
| 8,153,475 B1 | 4/2012 | Shum et al. |
| 8,157,422 B2 | 4/2012 | Paik et al. |
| 8,164,237 B2 | 4/2012 | Wen |
| 8,206,015 B2 | 6/2012 | Cho et al. |
| D662,899 S | 7/2012 | Shum et al. |
| D662,900 S | 7/2012 | Shum et al. |
| 8,215,800 B2 | 7/2012 | Plank |
| 8,220,970 B1 | 7/2012 | Khazi et al. |
| 8,227,962 B1 | 7/2012 | Su |
| 8,242,669 B2 | 8/2012 | Qiu |
| 8,272,762 B2 | 9/2012 | Maxik et al. |
| 8,324,835 B2 | 12/2012 | Shum et al. |
| D674,960 S | 1/2013 | Chen et al. |
| 8,390,207 B2 | 3/2013 | Dowling et al. |
| 8,405,947 B1 | 3/2013 | Green et al. |
| 8,414,151 B2 | 4/2013 | Allen et al. |
| 8,525,396 B2 | 9/2013 | Shum et al. |
| 8,567,999 B2 | 10/2013 | Paik et al. |
| 8,579,470 B1 | 11/2013 | Leahy et al. |
| D694,722 S | 12/2013 | Shum et al. |
| 8,618,742 B2 | 12/2013 | Shum et al. |
| 8,643,257 B2 | 2/2014 | Shum et al. |
| 8,651,711 B2 | 2/2014 | Rudisill et al. |
| 8,680,787 B2 | 3/2014 | Veskovic |
| 8,746,918 B1 | 6/2014 | Rubino |
| 8,752,975 B2 | 6/2014 | Rubino |
| 8,803,452 B2 | 8/2014 | Shum et al. |
| 8,829,774 B1 | 9/2014 | Shum et al. |
| 8,884,501 B2 | 11/2014 | Cho et al. |
| 8,884,517 B1 | 11/2014 | Shum et al. |
| 8,888,332 B2 | 11/2014 | Martis et al. |
| 2001/0021073 A1 | 9/2001 | Leggo et al. |
| 2003/0039122 A1 | 2/2003 | Cao |
| 2003/0058650 A1 | 3/2003 | Shih |
| 2003/0107885 A1 | 6/2003 | Galli |
| 2003/0183835 A1 | 10/2003 | Moku et al. |
| 2004/0222427 A1 | 11/2004 | Hsiung |
| 2004/0264195 A1 | 12/2004 | Chang et al. |
| 2005/0122690 A1 | 6/2005 | Hood et al. |
| 2005/0174780 A1 | 8/2005 | Park |
| 2005/0214992 A1 | 9/2005 | Chakraborty et al. |
| 2006/0028310 A1 | 2/2006 | Asano et al. |
| 2006/0175045 A1 | 8/2006 | Chen |
| 2006/0262545 A1 | 11/2006 | Piepgras et al. |
| 2006/0274529 A1 | 12/2006 | Cao |
| 2007/0007898 A1 | 1/2007 | Bruning |
| 2007/0158797 A1 | 7/2007 | Lee |
| 2007/0228999 A1 | 10/2007 | Kit |
| 2007/0284564 A1 | 12/2007 | Biwa et al. |
| 2008/0002444 A1 | 1/2008 | Shekhawat et al. |
| 2008/0049399 A1 | 2/2008 | Lu et al. |
| 2008/0080137 A1 | 4/2008 | Otsuki et al. |
| 2008/0123341 A1 | 5/2008 | Chiu |
| 2008/0142781 A1 | 6/2008 | Lee |
| 2008/0158887 A1 | 7/2008 | Zhu et al. |
| 2008/0164489 A1 | 7/2008 | Schmidt et al. |
| 2008/0266866 A1 | 10/2008 | Tsai |
| 2008/0315228 A1 | 12/2008 | Krames et al. |
| 2009/0027878 A1 | 1/2009 | Metz et al. |
| 2009/0072252 A1 | 3/2009 | Son et al. |
| 2009/0109687 A1* | 4/2009 | Householder ............ F21L 4/027 362/309 |
| 2009/0134421 A1 | 5/2009 | Negley |
| 2009/0154166 A1 | 6/2009 | Zhang et al. |
| 2009/0161356 A1 | 6/2009 | Negley et al. |
| 2009/0175043 A1 | 7/2009 | Frick |
| 2009/0194252 A1 | 8/2009 | Lee et al. |
| 2009/0195186 A1 | 8/2009 | Guest et al. |
| 2009/0219716 A1* | 9/2009 | Weaver .................... F21V 3/04 362/235 |
| 2009/0231895 A1 | 9/2009 | Hu |
| 2009/0237940 A1 | 9/2009 | Wu et al. |
| 2009/0244899 A1 | 10/2009 | Chyn |
| 2009/0303738 A1 | 12/2009 | Suss et al. |
| 2009/0303762 A1 | 12/2009 | Jang et al. |
| 2010/0060130 A1 | 3/2010 | Li |
| 2010/0061076 A1 | 3/2010 | Mandy et al. |
| 2010/0066266 A1 | 3/2010 | Huang et al. |
| 2010/0091487 A1 | 4/2010 | Shin |
| 2010/0148145 A1 | 6/2010 | Ishibashi et al. |
| 2010/0207502 A1 | 8/2010 | Cao et al. |
| 2010/0207534 A1 | 8/2010 | Dowling et al. |
| 2010/0244648 A1 | 9/2010 | Yoo |
| 2010/0264799 A1 | 10/2010 | Liu et al. |
| 2010/0277068 A1 | 11/2010 | Broitzman |
| 2010/0290229 A1 | 11/2010 | Meyer, Sr. et al. |
| 2010/0320499 A1 | 12/2010 | Catalano et al. |
| 2011/0018418 A1 | 1/2011 | Yoo |
| 2011/0032708 A1 | 2/2011 | Johnston et al. |
| 2011/0056429 A1 | 3/2011 | Raring et al. |
| 2011/0074270 A1 | 3/2011 | Van De Ven et al. |
| 2011/0095686 A1 | 4/2011 | Falicoff et al. |
| 2011/0140586 A1 | 6/2011 | Wang |
| 2011/0169406 A1 | 7/2011 | Weekamp et al. |
| 2011/0175510 A1 | 7/2011 | Rains, Jr. et al. |
| 2011/0175528 A1 | 7/2011 | Rains, Jr. et al. |
| 2011/0182065 A1 | 7/2011 | Negley et al. |
| 2011/0198979 A1 | 8/2011 | Shum et al. |
| 2011/0204763 A1 | 8/2011 | Shum et al. |
| 2011/0204779 A1 | 8/2011 | Shum et al. |
| 2011/0204780 A1 | 8/2011 | Shum et al. |
| 2011/0215699 A1 | 9/2011 | Le et al. |
| 2011/0242823 A1 | 10/2011 | Tracy et al. |
| 2011/0260945 A1 | 10/2011 | Karasawa |
| 2011/0298371 A1 | 12/2011 | Brandes et al. |
| 2011/0309734 A1 | 12/2011 | Lin et al. |
| 2012/0018754 A1 | 1/2012 | Lowes |
| 2012/0043552 A1 | 2/2012 | David et al. |
| 2012/0043913 A1 | 2/2012 | Melanson |
| 2012/0161626 A1 | 6/2012 | van de Ven et al. |
| 2012/0187830 A1 | 7/2012 | Shum et al. |
| 2012/0212960 A1 | 8/2012 | Rodriguez |
| 2012/0293062 A1 | 11/2012 | Pickard |
| 2012/0314403 A1 | 12/2012 | Kennedy et al. |
| 2012/0319148 A1 | 12/2012 | Donofrio et al. |
| 2012/0320579 A1 | 12/2012 | Ferguson et al. |
| 2013/0058099 A1 | 3/2013 | Shum et al. |
| 2013/0322089 A1 | 12/2013 | Martis et al. |
| 2013/0343062 A1 | 12/2013 | Shum et al. |

(56) References Cited

U.S. PATENT DOCUMENTS

| | | |
|---|---|---|
| 2014/0028214 A1 | 1/2014 | Mazumdar et al. |
| 2014/0091697 A1 | 4/2014 | Shum |
| 2014/0146545 A1 | 5/2014 | Shum et al. |
| 2014/0175966 A1 | 6/2014 | Tan |
| 2014/0313749 A1 | 10/2014 | Shum et al. |

FOREIGN PATENT DOCUMENTS

| | | |
|---|---|---|
| CN | 2009-75612 | 11/2007 |
| CN | 101608746 | 8/2011 |
| CN | 102149960 | 8/2011 |
| CN | 203099372 U | 7/2013 |
| JP | 02-028541 | 1/1990 |
| JP | 2000-517465 | 12/2000 |
| JP | 2005-302483 | 10/2009 |
| JP | 2011-501351 | 1/2011 |
| WO | WO 2009/048956 | 3/2009 |
| WO | WO 2009/149263 | 12/2009 |
| WO | WO 2009/156969 | 12/2009 |
| WO | WO 2011/054716 | 5/2011 |

OTHER PUBLICATIONS

USPTO Office Action for U.S. Appl. No. 13/480,767 dated Dec. 18, 2014 (17 pages).
USPTO Office Action for U.S. Appl. No. 13/855,423 dated Mar. 17, 2015 (22 pages).
USPTO Notice of Allowance for U.S. Appl. No. 29/441,108 dated Mar. 13, 2015 (7 pages).
USPTO Notice of Allowance for U.S. Appl. No. 29/469,709 dated Feb. 6, 2015 (5 pages).
Communication from the Chinese Patent Office re 201210322687.1 dated Mar. 3, 2014, 8 pages.
USPTO Office Action for U.S. Appl. No. 13/535,142 dated Feb. 25, 2014, 23 pages.
Haskell et al., 'Defect Reduction in (100) m-plane gallium nitride via lateral epitaxial overgrowth by hydride vapor phase epitaxy', Applied Physics Letters 86, 111917 (2005), pp. 1-3.
International Preliminary Report & Written Opinion of PCT Application No. PCT/US2011/060030 dated Mar. 21, 2012, 11 pgs. total.
'CFL ballast IC drive LED', www.placardshop.com, Blog, May 22, 2012, 3 pgs.
'Thermal Properties of Plastic Materials', Professional Plastics, 2010, pp. 1-4.
Rausch, 'Use a CFL ballast to drive LEDs', www.edn.com, Apr. 26, 2007, pp. 1-2.
USPTO Office Action for U.S. Appl. No. 12/785,953 dated Apr. 12, 2012 (12 pages).
USPTO Office Action for U.S. Appl. No. 12/785,953 dated Jan. 11, 2013 (15 pages).
USPTO Office Action for U.S. Appl. No. 13/025,791 dated Nov. 25, 2011 (12 pages).
USPTO Office Action for U.S. Appl. No. 13/025,791 dated Feb. 20, 2013 (13 pages).
USPTO Notice of Allowance for U.S. Appl. No. 13/025,791 dated Jun. 17, 2013 (8 pages).
USPTO Office Action for U.S. Appl. No. 13/025,833 dated Dec. 14, 2011 (11 pages).
USPTO Office Action for U.S. Appl. No. 13/025,833 dated Jul. 12, 2012 (15 pages).
USPTO Office Action for U.S. Appl. No. 13/025,833 dated Apr. 26, 2013 (23 pages).
USPTO Office Action for U.S. Appl. No. 13/025,849 dated Mar. 15, 2013 (18 pages).
USPTO Office Action for U.S. Appl. No. 13/025,860 dated Dec. 30, 2011 (15 pages).
USPTO Notice of Allowance for U.S. Appl. No. 13/025,860 dated Jun. 8, 2012 (10 pages).
USPTO Notice of Allowance for U.S. Appl. No. 13/269,193 dated Mar. 31, 2014 (8 pages).
USPTO Office Action for U.S. Appl. No. 13/274,489 dated Mar. 27, 2014 (14 pages).
USPTO Office Action for U.S. Appl. No. 13/480,767 dated Apr. 29, 2014 (21 pages).
USPTO Notice of Allowance for U.S. Appl. No. 29/399,523 dated Mar. 5, 2012 (8 pages).
USPTO Notice of Allowance for U.S. Appl. No. 29/399,524 dated Mar. 2, 2012 (9 pages).
Communication from the Japanese Patent Office re 2013532993 dated Jul. 9, 2014 (5 pages).
USPTO Notice of Allowance for U.S. Appl. No. 13/959,422 dated Jul. 9, 2014 (7 pages).
USPTO Notice of Allowance for U.S. Appl. No. 13/025,849 dated Sep. 16, 2013, 10 pages.
USPTO Office Action for U.S. Appl. No. 13/274,489 dated Sep. 6, 2013, 13 pages.
USPTO Office Action for U.S. Appl. No. 13/535,142 dated Aug. 1, 2013, 14 pages.
USPTO Notice of Allowance for U.S. Appl. No. 29/423,725 dated Jul. 19, 2013, 11 pages.
Nakamura, 'Candela-Class High-Brightness InGaN/AlGaN Double-Heterostructure Blue-Light-Emitting Diodes', Applied Physics Letters, vol. 64, No. 13, Mar. 1994, p. 1687-1689.
Communication from the Japanese Patent Office re 2012191931, dated Oct. 11, 2013, 4 pages.
USPTO Notice of Allowance for U.S. Appl. No. 13/025,833 dated Oct. 11, 2013 (11 pages).
USPTO Office Action for U.S. Appl. No. 13/269,193 dated Oct. 3, 2013 (12 pages).
USPTO Office Action for U.S. Appl. No. 13/480,767 dated Oct. 25, 2013 (28 pages).
USPTO Office Action for U.S. Appl. No. 13/535,142 dated Nov. 14, 2013 (23 pages).
USPTO Office Action for U.S. Appl. No. 13/959,422 dated Oct. 8, 2013 (10 pages).
USPTO Notice of Allowance U.S. Appl. No. 13/274,489 dated Sep. 30, 2014 (7 pages).
USPTO Office Action for U.S. Appl. No. 13/535,142 dated Sep. 22, 2014 (25 pages).
USPTO Notice of Allowance U.S. Appl. No. 13/856,613 dated Nov. 21, 2014 (8 pages).
USPTO Notice of Allowance U.S. Appl. No. 13/909,752 dated Sep. 30, 2014 (9 pages).
USPTO Office Action U.S. Appl. No. 14/014,112 dated Nov. 19, 2014 (24 pages).
USPTO Office Action U.S. Appl. No. 14/054,597 dated Dec. 5, 2014 (9 pages).
USPTO Office Action U.S. Appl. No. 14/075,936 dated Sep. 24, 2014 (7 pages).
USPTO Office Action U.S. Appl. No. 14/097,043 dated Oct. 15, 2014 (11 pages).
USPTO Office Action U.S. Appl. No. 14/211,606 dated Nov. 28, 2014 (18 pages).

* cited by examiner

CROSS-SECTION AA

A prism reflector having an array of right-angle prisms running along radial lines (from center to edge).

COMPACT LENS FOR HIGH INTENSITY LIGHT SOURCE

This application is a continuation-in-part of U.S. application Ser. No. 13/865,760 filed on Apr. 18, 2013, and claims benefit under 35 U.S.C. §119(e) to U.S. Provisional Application No. 61/707,757 filed on Sep. 28, 2012, and U.S. Provisional Application No. 61/646,766 filed on May 14, 2012, each of which is incorporated by reference for all purposes.

FIELD

The present invention relates to lighting. More specifically, embodiments of the present invention relate to a compact optic lens for a high intensity light source having improved output beam characteristics. Some general goals include, increasing light output without increasing device cost or device size to enable coverage of many beam angles.

BACKGROUND

The present invention relates to lighting. More specifically, the present invention relates to a compact optic lens for a high intensity light source.

The era of the Edison vacuum light bulb will be coming to an end soon. In many countries and in many states, common incandescent bulbs are becoming illegal, and more efficient lighting sources are being mandated. Some of the alternative light sources currently include fluorescent tubes, halogen, and light emitting diodes (LEDs). Despite the availability and improved efficiencies of these other options, many people have still been reluctant to switch to these alternative light sources.

The inventors of the present believe that there are several key reasons why consumers have been slow to adopt the newer technologies. One such reason is the use of toxic substances in the lighting sources. As an example, fluorescent lighting sources typically rely upon mercury in a vapor form to produce light. Because the mercury vapor is considered a hazardous material, spent lamps cannot simply be disposed of at the curbside but must be transported to designated hazardous waste disposal sites. Additionally, some fluorescent tube manufacturers go so far as to instruct the consumer to avoid using the bulb in more sensitive areas of the house such as bedrooms, kitchens, and the like.

The inventors of the present invention also believe that another reason for the slow adoption of alternative lighting sources is the low performance compared to the incandescent light bulb. As an example, fluorescent lighting sources often rely upon a separate starter or ballast mechanism to initiate the illumination. Because of this, fluorescent lights sometimes do not turn on "instantaneously" as consumers expect and demand. Further, fluorescent lights typically do not immediately provide light at full brightness, but typically ramp up to full brightness within an amount of time (e.g., 30 seconds). Further, most fluorescent lights are fragile, are not capable of dimming, have ballast transformers that can emit annoying audible noise, and can fail in a shortened period of time if cycled on and off frequently. Because of this, fluorescent lights do not have the performance consumers require.

Another type of alternative lighting source more recently introduced relies on the use of light emitting diodes (LEDs). LEDs have advantages over fluorescent lights including the robustness and reliability inherent in solid state devices, the lack of toxic chemicals that can be released during accidental breakage or disposal, instant-on capabilities, dimmability, and the lack of audible noise. The inventors of the present invention believe, however, that current LED lighting sources themselves have significant drawbacks that cause consumers to be reluctant to using them.

A key drawback with current LED lighting sources is that the light output (e.g., lumens) is relatively low. Although current LED lighting sources draw a significantly lower amount of power than their incandescent equivalents (e.g., 5-10 watts v. 50 watts), they are believe to be far too dim to be used as primary lighting sources. As an example, a typical 5 watt LED lamp in the MR16 form factor may provide 200-300 lumens, whereas a typical 50 watt incandescent bulb in the same form factor may provide 700-1000 lumens. As a result, current LEDs are often used only for exterior accent lighting, closets, basements, sheds or other small spaces.

Another drawback with current LED lighting sources includes that the upfront cost of the LED is often shockingly high to consumers. For example, for floodlights, a current 30 watt equivalent LED bulb may retail for over $60, whereas a typical incandescent floodlight may retail for $12. Although the consumer may rationally "make up the difference" over the lifetime of the LED by the LED consuming less power, the inventors believe the significantly higher prices greatly suppress consumer demand. Because of this, current LED lighting sources do not have the price or performance that consumers expect and demand.

Additional drawbacks with current LED lighting sources includes they have many parts and are labor intensive to produce. As merely an example, one manufacturer of an MR16 LED lighting source utilizes over 14 components (excluding electronic chips), and another manufacturer of an MR 16 LED lighting source utilizes over 60 components. The inventors of the present invention believe that these manufacturing and testing processes are more complicated and more time consuming, compared to manufacturing and testing of a LED device with fewer parts and a more modular manufacturing process.

Additional drawbacks with current LED lighting sources, are that the output performance is limited by heat sink volume. More specifically, the inventors believe for replacement LED light sources, such as MR16 light sources, current heat sinks are incapable of dissipating very much heat generated by the LEDs under natural convection. In many applications, the LED lamps are placed into an enclosure such as a recessed ceiling that already have an ambient air temperatures to over 50 degrees C. At such temperatures the emissivity of surfaces plays only a small roll of dissipating the heat. Further, because conventional electronic assembly techniques and LED reliability factors limit PCB board temperatures to about 85 degrees C., the power output of the LEDs is also greatly constrained. At higher temperatures, the inventors have discovered that radiation plays much more important role thus high emissivity for a heat sink is desirable.

Traditionally, light output from LED lighting sources have been increased by simply increasing the number of LEDs, which has led to increased device costs, and increased device size. Additionally, such lights have had limited beam angles and limited outputs due to limitations on the dimensions of reflectors and other optics.

Accordingly, what is desired is a highly efficient lighting source without the drawbacks described above.

SUMMARY

Embodiments of the present invention utilize a monolithically formed optical lens having multiple regions that modify and direct light from the high intensity light source towards an output. In some embodiments, the ultimate output beam angle, beam shape, beam transitions (e.g., falloff), and the like determined by physical characteristics of the monolithically formed optical lens.

According to one aspect of the invention, a compact optic lens for a high intensity light source is described. One device includes a molded transparent body having a light receiving region, a light reflecting region, a light blending region, and a light output region. In various embodiments, the light receiving region comprises a first geometric structure within the transparent body that is configured to receive input light from the high intensity light source within a plurality of first two-dimensional planes, and configured to provide first output light within the first two-dimensional planes within the transparent body to a light reflecting region. In some embodiments, the light reflecting region comprises a surface on the transparent body that is configured to receive the first output light from the light receiving region, and configured to provide second output light within the plurality of first two-dimensional planes within the transparent body to the light blending region. In some embodiments, the light blending region comprises a plurality of prism structures formed on the transparent body that are configured to receive the second output light from the light reflecting region, wherein the plurality of prism structures are configured to optically deflect the second output light to form deflected output light within a plurality of second two-dimensional planes, and wherein the plurality of prism structures are configured to provide the deflected output light as blended light within the transparent body to the light output region. In yet other embodiments, the plurality of first two-dimensional plane and the plurality of second two-dimensional planes intersect, and the light output region comprises the surface on the transparent body that is configured to receive the blended light and output the blended light.

According to another aspect of the invention, a method for blending light rays from a light source within a optic lens including a light receiving region, a light reflecting region, a light blending region, and a light output region is described. One technique includes receiving in the light receiving region, a first light ray associated with a first two-dimensional plane from the high intensity light source and providing a first output light ray to the light reflecting region, and a second light ray associated with a second two-dimensional plane from the high intensity light source and providing a second output light ray to the light reflecting region, wherein the first two-dimensional plane and the second two-dimensional plane are not parallel. One process includes receiving in the light reflecting region the first output light ray from the light receiving region and providing a third light ray associated with the first two-dimensional plane to the light blending region, and the second output light ray from the light receiving region and providing a fourth light ray associated with the second two-dimensional plane to the light blending region. A method includes receiving in a plurality of prismatic structures, the third light ray from the light reflecting region and providing a fifth light ray associated with a third two-dimensional plane to the light output region, and the fourth light ray from the light reflecting region and providing a sixth light ray associated with a fourth two-dimensional plane to the light output region, wherein the first two-dimensional plane and the third two-dimensional plane are not parallel, and wherein the second two-dimensional plane and the fourth two-dimensional plane are not parallel. A method includes receiving at a specific location on the light output region, the fifth light ray and the sixth light ray, and outputting blended light in response to the fifth light ray and the sixth light ray.

According to yet another aspect of the invention, an illumination source configured to output blended light is described. One source includes an LED light unit configured to provide non-uniform light output in response to an output driving voltage, and a driving module coupled to the LED light unit, wherein the driving module is configured to receive an input driving voltage and configured to provide the output driving voltage. A lamp includes a heat sink coupled to the LED light unit, wherein the heat sink is configured to dissipate heat produced by the LED light unit and the driving module, and a reflector coupled to the heat sink, wherein the reflector is configured to receive the non-uniform light output, and wherein the reflector is configure to output a light beam having reduced non-uniform light output.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION

The inventor of the present invention has discovered that with typical single LED lighting assemblies and multiple LED lighting assemblies, the output light beam is typically non-spatially uniform. For instance, the inventor has noted that, the output light beams of many current LED light sources have hot-spots, dark-spots, roll-offs, rings, and the like. The inventor considers such non-uniformities as unattractive and unacceptable for use in many if not most lighting applications. In light of this, the inventor has developed a lighting source that has reduced non-uniform output light beams. Additionally, the inventor has developed a reflective lens capable of receiving non-uniform input light beams, and outputting output light beams with reduced non-uniformity. In some embodiments, the output light beam of the reflective may have increased non-uniformity in output light beams, by specific design, e.g., a light ring pattern.

Figure 1:
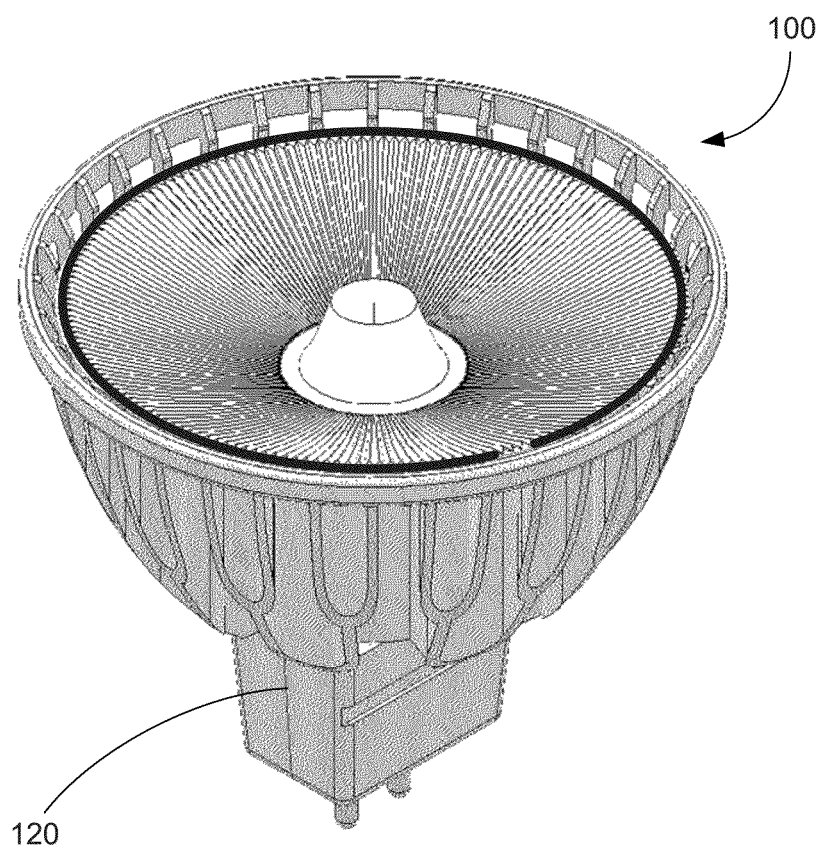
FIG. 1 and FIG. 2 illustrate various embodiments of the present invention.
Figure 2:
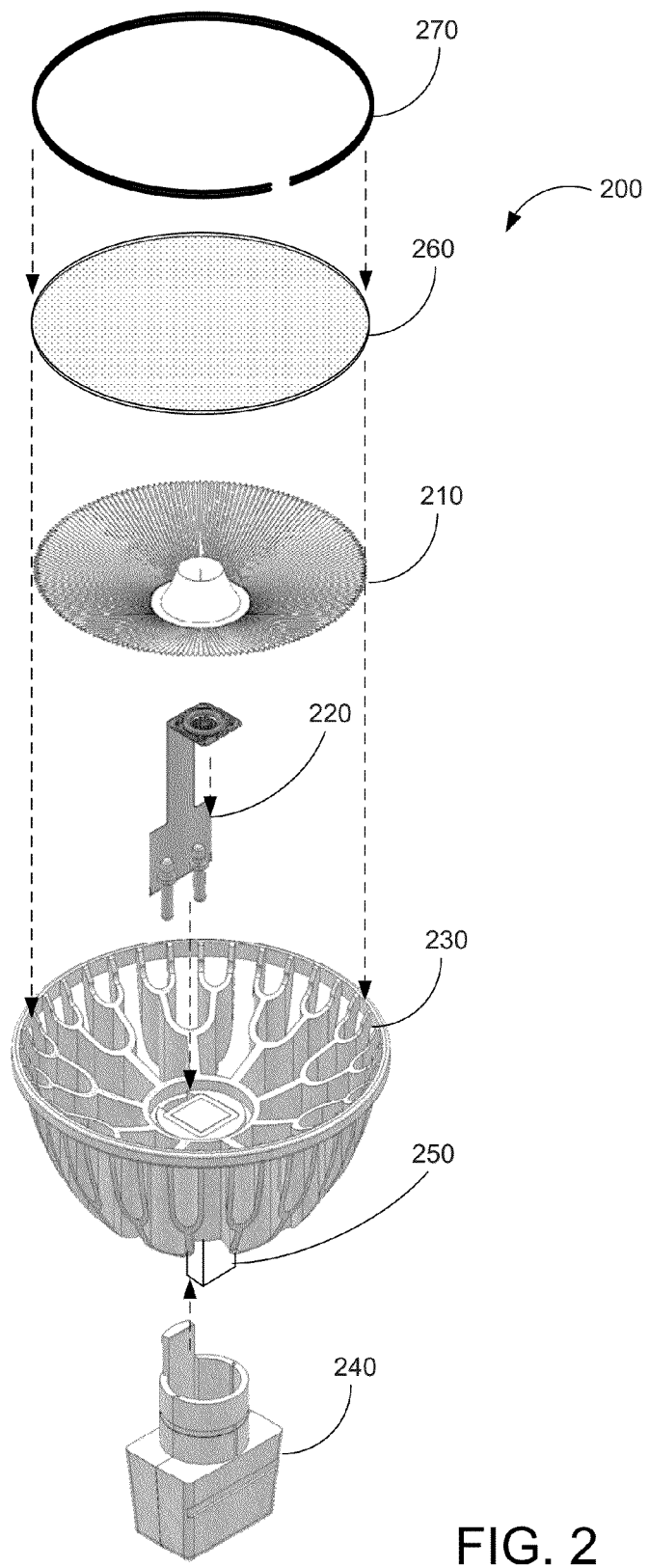

FIG. 1 illustrates an embodiment of the present invention. More specifically, FIGS. 1 and 2 illustrate embodiments (e.g., in an MR-16 form factor) of an MR-16 light source compatible LED lighting source 100 having GU 5.3 form factor compatible base 120. MR-16 lighting sources typically operate upon 12 volts, alternating current (e.g., VAC). In the examples illustrated, LED lighting source 100 is configured to provide a spot light having approximately a 10 degree beam size. In other embodiments LED lighting sources may be configured to provide a flood light having a 25 or 40 degree beam size, or any other lighting pattern.

In various embodiments, an LED assembly described in the pending patent applications described above, and variations thereof, may be used within LED lighting source 100. These LED assemblies are currently under development by the assignee of the present patent application. In various embodiments, LED lighting source 100 may provide a peak output brightness of approximately 7600 to 8600 candelas (with approximately 360 to 400 lumens), a peak output brightness of approximately 1050 to 1400 candelas for a 40 degree flood light (with approximately 510 to 650 lumens), and a peak output of approximately 2300 to 2500 candelas for a 25 degree flood light (with approximately 620 to 670 lumens), and the like. Various embodiments of the present invention therefore are believed to have achieved the same brightness as conventional halogen bulb MR-16 lights.

FIG. 2 illustrates a modular diagram according to various embodiments of the present invention. As can be seen in FIG. 2 in various embodiments, light 200 includes a reflecting lens 210, an integrated LED module/assembly 220, a heat sink 230, a base housing 240, a transmissive optical lens (e.g., transmissive lens 260, optional), and a retainer 270. As will be discussed further below, in various embodiments, the modular approach to assembling light 200 are believed to reduce the manufacturing complexity, reduce manufacturing costs, and increase the reliability of such lights.

In various embodiments, reflective lens 210 and transmissive lens 260 may be formed from a UV and resistant transparent material, such as glass, polycarbonate material, or the like. In various embodiments, lens 210 or lens 260 may be clear and transmissive or solid or coated and reflective. In the case of lens 210, the solid material creates a folded light path such that light that is generated by the integrated LED assembly 220 internally reflects within lens 210 more than one time prior to being output. Such a folded optic lens enables light 200 to have a tighter columniation of light than is normally available from a conventional reflector of equivalent depth, as will be discussed further below. In the case of lens 260, the solid material may be clear or tinted, may be machined or molded, or the like to control the output characteristics of the light from lens 210.

In various embodiments, to increase durability of the lights, the optical materials should be operable at an elevated temperature (e.g., 120 degrees C.) for a prolonged period of time (e.g., hours). One material that may be used for lens 210 is known as Makrolon™ LED 2045 or LED 2245 polycarbonate available from Bayer Material Science AG. In other embodiments, other similar materials may also be used.

In FIG. 2, lens 210 may be secured to heat sink 230 via one or more indentations or heat dissipation fins on heat sink 230, or the like. In addition, lens 210 may also be secured via an adhesive proximate to where integrated LED assembly 220 is secured to heat sink 230. In various embodiments, separate clips may be used to restrain lens 210. These clips may be formed of heat resistant plastic material that is preferably white colored to reflect backward scattered light back through the lens.

In other embodiments, transmissive lens 260 may be secured to heat sink 230 via the clips described above. Alternatively, transmissive lens 260 may first be secured to a retaining ring 270, and retaining ring may be secured to one or more indents of heat sink 230, as will be illustrated below in greater detail. In some embodiments, once transmissive lens 260 and a retaining mechanism (e.g., retaining ring 270) is secured to lens 210 or heat sink 230, they cannot be removed by hand. In such cases, one or more tools must be used to separate these components. In other embodiments, these components may be removed from lens 210 or heat sink 230 simply by hand.

In various embodiments of the present invention, LED assemblies may be binned based upon lumen per watt efficacy. For example, in some examples, an integrated LED module/assembly having a lumen per watt (L/W) efficacy from 53 to 66 L/W may be binned for use for 40 degree flood lights, a LED assembly having an efficacy of approximately 60 L/W may be binned for use for spot lights, a LED assembly having an efficacy of approximately 63 to 67 L/W may be used for 25 degree flood lights, and the like. In other embodiments, other classification or categorization of LED assemblies on the basis of L/W efficacy may be used for other target applications.

In some embodiments, as will be illustrated below integrated LED assembly/module 220 includes 36 LEDs arranged in series, in parallel series (e.g., three parallel strings of 12 LEDs in series), or the like. In other embodiments, any number of LEDs may be used, e.g., 1, 10, 16, or the like. In other embodiments, the LEDs may be electrically coupled in other manner, e.g., all series, or the like. Further detail regarding such LED assemblies is provided in the patent applications incorporated by reference above.

In various embodiments, the targeted power consumption for LED assemblies is less than 13 watts. This is much less than the typical power consumption of halogen based MR16 lights (50 watts). Accordingly, embodiments of the present invention are able to match the brightness or intensity of halogen based MR16 lights, but using less than 20% of the energy.

In various embodiments of the present invention, LED assembly 220 is directly secured to heat sink 230 to dissipate heat from the light output portion and/or the electrical driving circuits. In some embodiments, heat sink 230 may include a protrusion portion 250 to be coupled to electrical driving circuits. As will be discussed below, LED assembly 220 typically includes a flat substrate such as silicon or the like. In various embodiments, it is contemplated that an operating temperature of LED assembly 220 may be on the order of 125 to 140 degrees C. The silicon substrate is then secured to the heat sink using a high thermal conductivity epoxy (e.g., thermal conductivity ~96 W/m.k.). In some embodiments, a thermoplastic/thermo set epoxy may be used such as TS-369, TS-3332-LD, or the like, available from Tanaka Kikinzoku Kogyo K.K. Other epoxies may also be used. In some embodiments, no screws are otherwise used to secure the LED assembly to the heat sink, however, screws or other fastening means may also be used in other embodiments.

In various embodiments, heat sink 230 may be formed from a material having a low thermal resistance/high thermal conductivity. In some embodiments, heat sink 230 may be formed from an anodized 6061-T6 aluminum alloy having a thermal conductivity k=167 W/m.k., and a thermal emissivity e=0.7. In other embodiments, other materials may be used such as 6063-T6 or 1050 aluminum alloy having a thermal conductivity k=225 W/m.k. and a thermal emissivity e=0.9. In other embodiments, still other alloys such AL 1100, or the like may be used. Additional coatings may also be added to increase thermal emissivity, for example, paint provided by ZYP Coatings, Inc. utilizing $CR_2O_3$ or $CeO_2$ may provide a thermal emissivity e=0.9; coatings provided by Materials Technologies Corporation under the brand name Duracon™ may provide a thermal emissivity e>0.98; and the like. In other embodiments, heat sink 230 may include other metals such as copper, or the like.

In some example, at an ambient temperature of 50 degrees C., and in free natural convection heat sink 230 has been measured to have a thermal resistance of approximately 8.5 degrees C./Watt, and heat sink 290 has been measured to have a thermal resistance of approximately 7.5 degrees C./Watt. With further development and testing, it is believed that a thermal resistance of as little as 6.6 degrees C./Watt is achievable in other embodiments. In light of the present patent disclosure, it is believed that one of ordinary skill in the art will be able to envision other materials having different properties within embodiments of the present invention.

In various embodiments, base assembly/module 240 in FIG. 2 provides a standard GU 5.3 physical and electronic interface to a light socket. As will be described in greater detail below, a cavity within base module 240 includes high temperature resistant electronic circuitry used to drive LED module 220. In various embodiments, an input voltage of 12 VAC to the lamps are converted to 120 VAC, 40 VAC, or other voltage by the LED driving circuitry. The driving voltage may be set depending upon specific LED configuration (e.g., series, parallel/series, etc.) desired. In various embodiments, protrusion portion 250 extends within the cavity of base module 240.

The shell of base assembly 240 may be formed from an aluminum alloy, and may formed from an alloy similar to that used for heat sink 230 and/or heat sink 290. In one example, an alloy such as AL 1100 may be used. In other embodiments, high temperature plastic material may be used. In some embodiments of the present invention, instead of being separate units, base assembly 240 may be monolithically formed with heat sink 230.

As illustrated in FIG. 2, a portion of the LED assembly 220 (silicon substrate of the LED device) contacts heat sink 230 in a recess within the heat sink 230. Additionally, another portion of the LED assembly 220 (containing the LED driving circuitry) is bent downwards and is inserted into an internal cavity of base module 240.

In various embodiments, to facilitate a transfer of heat from the LED driving circuitry to the shell of the base assemblies, and of heat from the silicon substrate of the LED device, a potting compound is provided. The potting compound may be applied in a single step to the internal cavity of base assembly 240 and to the recess within heat sink 230. In various embodiments, a compliant potting compound such as Omegabond® 200 available from Omega Engineering, Inc. or 50-1225 from Epoxies, Etc. may be used. In other embodiments, other types of heat transfer materials may be used.

Figure 3:
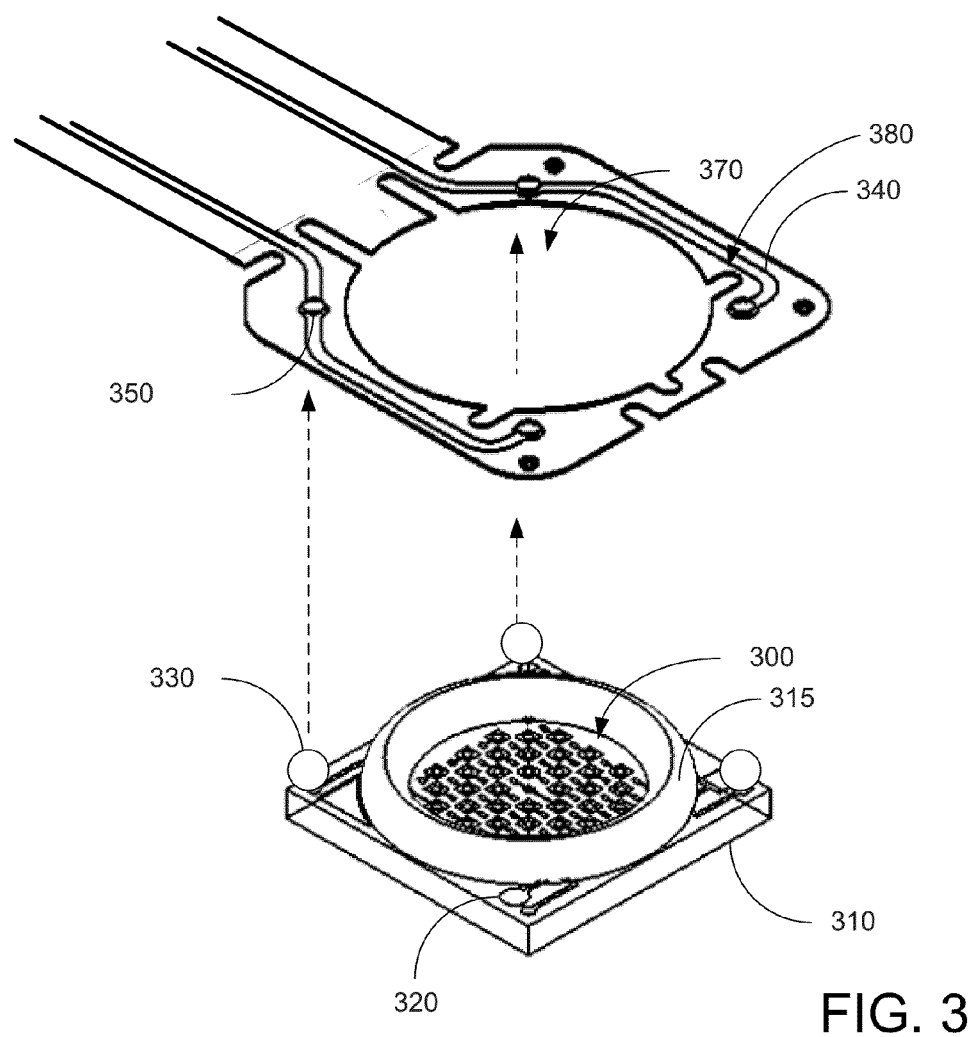
FIG. 3 and FIG. 4 illustrate modular diagrams according to various embodiments of the present invention.
Figure 4:
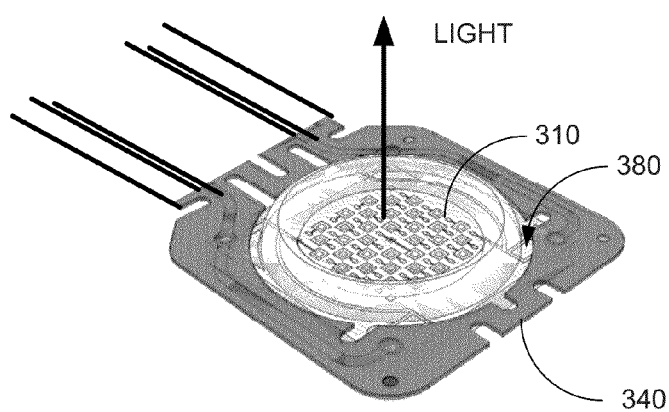

FIGS. 3 and 4 illustrate an embodiment of the present invention. More specifically, FIG. 3 illustrates an LED package subassembly (LED module) according to various embodiments. More specifically, a plurality of LEDs 300 is illustrated disposed upon a substrate 310. In some embodiments, it is contemplated that the plurality of LEDs 300 are connected in series and powered by a voltage source of approximately 120 volts AC (VAC). To enable a sufficient voltage drop (e.g., 3 to 4 volts) across each LED 300, in various embodiments 30 to 40 LEDs are contemplated to be used. In specific embodiments, 37 to 39 LEDs are coupled in series. In other embodiments, LEDs 300 are connected in parallel series and powered by a voltage source of approximately 40 VAC. For example, the plurality of LEDs 300 include 36 LEDs arranged in three groups each having 12 LEDs 300 coupled in series. Each group is thus coupled in parallel to the voltage source (40 VAC) provided by the LED driver circuitry, such that a sufficient voltage drop (e.g., 3 to 4 volts) is achieved across each LED 300. In other embodiments, other driving voltages are envisioned, and other arrangements of LEDs 300 are also envisioned.

In various embodiments, the LEDs 300 are mounted upon a silicon substrate 310, or other thermally conductive substrate. In various embodiments, a thin electrically insulating layer and/or a reflective layer may separate LEDs 300 and the silicon substrate 310. Heat produced from LEDs 300 is typically transferred to silicon substrate 310 and to a heat sink via a thermally conductive epoxy, as discussed above.

In various embodiments, silicon substrate is approximately 5.7 mm×5.7 mm in size, and approximately 0.6 microns in depth. The dimensions may vary according to specific lighting requirement. For example, for lower brightness intensity, fewer LEDs may be mounted upon the substrate, accordingly the substrate may decrease in size. In other embodiments, other substrate materials may be used and other shapes and sizes may also be used, such as approximately ovoid or round.

In various embodiments, the silicon substrate 310 and/or flexible printed circuit (FPC) 340 may have a specified (e.g., controlled) color, or these surfaces may be painted or coated with a material of a specified (e.g., controlled) color. In some embodiments, it has been recognized that some light from LEDs 300 that enters lens 210 may escape from the back side of lens 210. This escaped light may reflect from silicon substrate 310 and/or flexible printed circuit (FPC) 340, enter lens 210 and be output from the front of lens 210. A result is that light output from lens 210 may be tinted, colored, or affected by the color of silicon substrate 310 and/or FPC 340. Accordingly, in some embodiments, the surface coloring of these surfaces is controlled. In some instances, the color may be whitish, bluish, reddish, or any other color that is desired. In various embodiments, portions of heat sink 230 may also have a controlled color for similar reasons. For example, the surface of heat sink 230 facing lens 210 may be painted or anodized in a specific color such as white, silver, yellow, or the like. This surface may have a different color compared to other surfaces of heat sink 230. For example, heat sink 230 may be bronze in color, and the inner surface of heat sink 230 facing lens 210 may be silver in color, or the like.

As shown in FIG. 3, a ring of silicone 315 is disposed around LEDs 300 to define a well-type structure. In various embodiments, a phosphorus bearing material is disposed within the well structure. In operation, LEDs 300 provide a blue-ish light output, a violet, or a UV light output. In turn, the phosphorous bearing material is excited by the blue/UV output light, and emits white light output. Further details of embodiments of plurality of LEDs 300 and substrate 310 are described in the co-pending application incorporated by reference and referred to above.

As illustrated in FIG. 3, a number of bond pads 320 may be provided upon substrate 310 (e.g., 2 to 4). Then, a conventional solder layer (e.g., 96.5% tin and 5.5% gold) may be disposed upon silicon substrate 310, such that one or more solder balls 330 are formed thereon. In the embodiments illustrated in FIG. 3, four bond pads 320 are provided, one at each corner, two for each power supply connection. In other embodiments, only two bond pads may be used, one for each AC power supply connection.

Illustrated in FIG. 3 is a flexible printed circuit (FPC) 340. In various embodiments, FPC 340 may include a flexible substrate material such as a polyimide, such as Kapton™ from DuPont, or the like. As illustrated, FPC 340 may have a series of bonding pads 350, for bonding to silicon substrate 310, and bonding pads 360, for coupling to the high supply voltage (e.g., 120 VAC, 40 VAC, etc). Additionally, in some embodiments, an opening 370 is provided, through which LEDs 300 will shine through.

Various shapes and sizes for FPC 340 are contemplated in various embodiments of the present invention. For example, as illustrated in FIG. 3, a series of cuts 380 may be made upon FPC 340 to reduce the effects of expansion and contraction of FPC 340 versus substrate 310. As another example, a different number of bonding pads 350 may be provided, such as two bonding pads. As merely another example, FPC 340 may be crescent shaped, and opening 370 may not be a through hole. In other embodiments, other shapes and sizes for FPC 340 are contemplated in light of the present patent disclosure.

In FIG. 4, substrate 310 is bonded to FPC 340 via solder balls 330, in a conventional flip-chip type arrangement to the top surface of the silicon. By making the electrical connection at the top surface of the silicon, it is electrically isolated from the heat transfer surface of the silicon. This allows the entire bottom surface of the silicon substrate 310 to transfer heat to the heat sink. Additionally, this allows the LED to bonded directly to the heat sink to maximize heat transfer instead of a PCB material that typically inhibits heat transfer. As can be seen in this configuration, LEDs 300 are thus positioned to emit light through opening 370. In various embodiments, the potting compound discussed above is also used to serve as an under fill operation, or the like to seal the space 380 between substrate 310 and FPC 340.

After the electronic driving devices and the silicon substrate 310 are bonded to FPC 340, the LED package sub assembly or module 220 is thus assembled. In various embodiments, these LED modules may then be individually tested for proper operation.

Figure 5A:
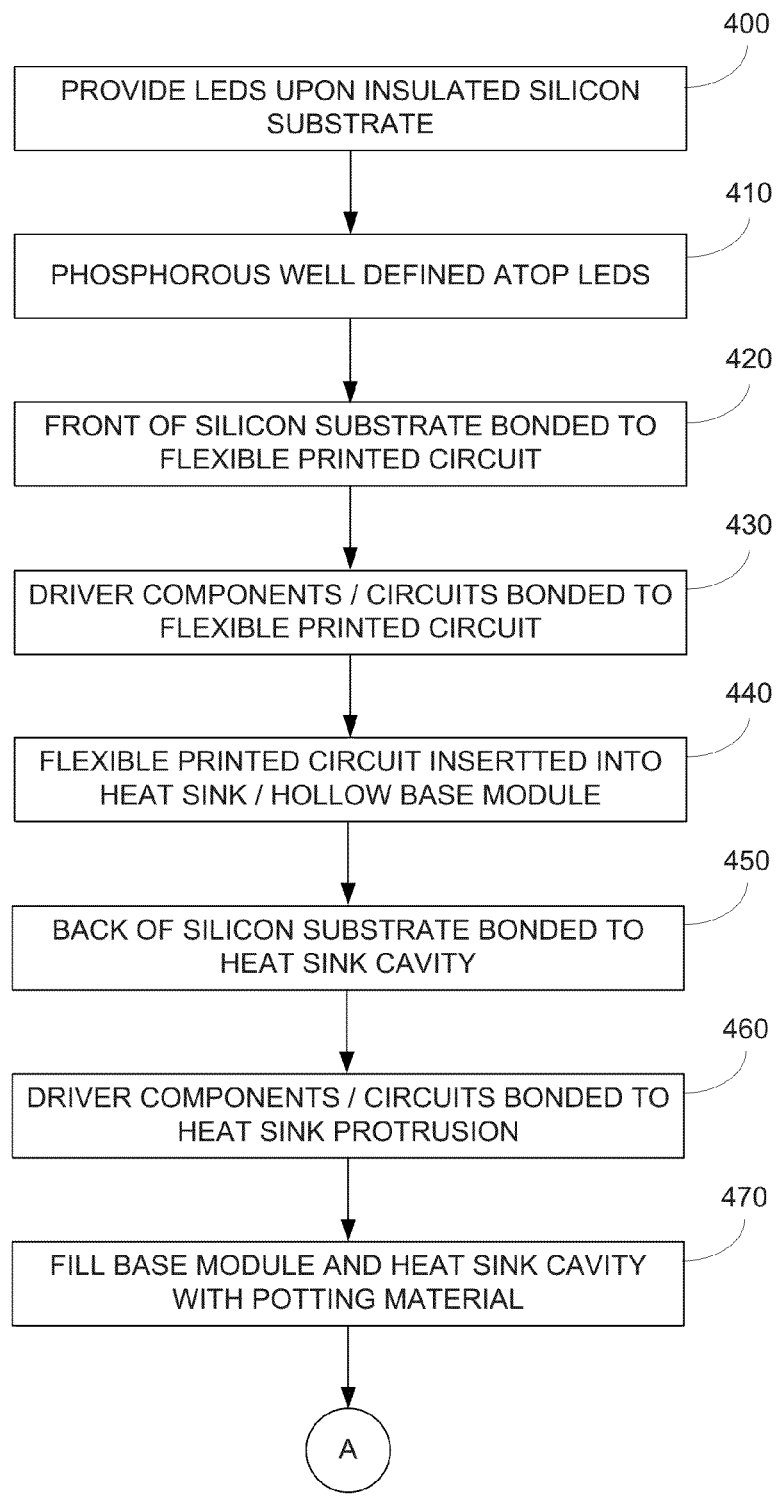
FIG. 5A and FIG. 5B illustrate an embodiment of the present invention.
Figure 5B:
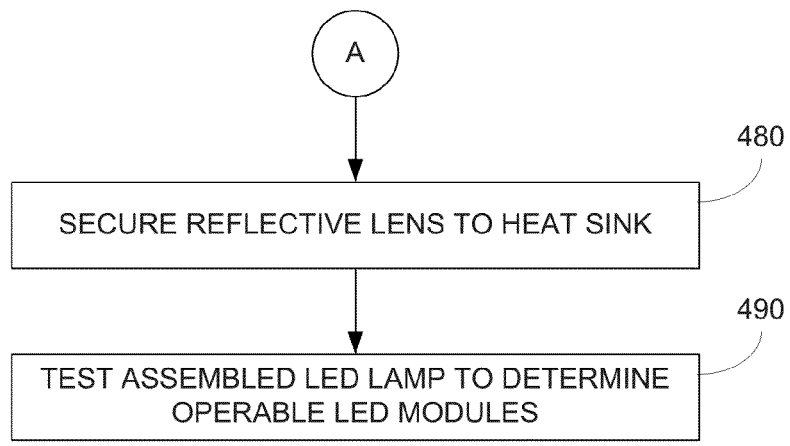

FIGS. 5A and 5B illustrate a block diagram of a manufacturing process according to embodiments of the present invention. In various embodiments, some of the manufacturing separate processes may occur in parallel or in series. For sake of understanding, reference may be given to features in prior figures.

In various embodiments, the following process may be performed to form an LED assembly/module. Initially, a plurality of LEDs 300 are provided upon an electrically insulated silicon substrate 310 and wired, step 400. As illustrated in FIG. 3, a silicone dam 315 is placed upon the silicon substrate 310 to define a well, which is then filled with a phosphor-bearing material, step 410. Next, the silicon substrate 310 is bonded to a flexible printed circuit 340, step 420. As disclosed above, a solder ball and flip-chip soldering (e.g., 330) may be used for the soldering process in various embodiments.

Next, a plurality of electronic driving circuit devices and contacts may be soldered to the flexible printed circuit 340, step 430. The contacts are for receiving a driving voltage of approximately 12 VAC. As discussed above, unlike present state of the art MR-16 light bulbs, the electronic circuit devices, in various embodiments, are capable of sustained high-temperature operation, e.g., 120 degrees C.

In various embodiments, the second portion of the flexible printed circuit including the electronic driving circuit is inserted into the heat sink and into the inner cavity of the base module, step 440. As illustrated, the first portion of the flexible printed circuit is then bent approximately 90 degrees such that the silicon substrate is adjacent to the recess of the heat sink. The back side of the silicon substrate is then bonded to the heat sink within the recess of the heat sink using an epoxy, or the like, step 450.

In various embodiments, one or more of the heat producing the electronic driving components/circuits may be bonded to the protrusion portion of the heat sink, step 460. In some embodiments, electronic driving components/circuits may have heat dissipating contacts (e.g., metal contacts) These metal contacts may be attached to the protrusion portion of the heat sink via screws (e.g., metal, nylon, or the like). In some embodiments, a thermal epoxy may be used to secure one or more electronic driving components to the heat sink. Subsequently a potting material is used to fill the air space within the base module and to serve as an under fill compound for the silicon substrate, step 470.

Subsequently, a reflective lens may be secured to the heat sink, step 480, and the LED light source may then be tested for proper operation, step 490.

Figure 7:
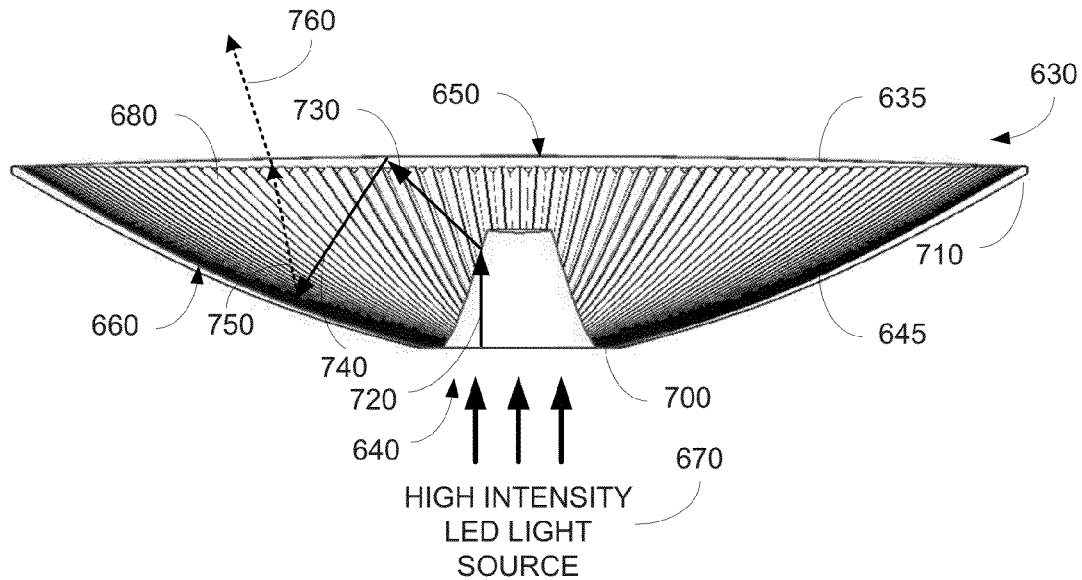
FIG. 6 and FIG. 7 illustrate various embodiments of the present invention.
Figure 6:
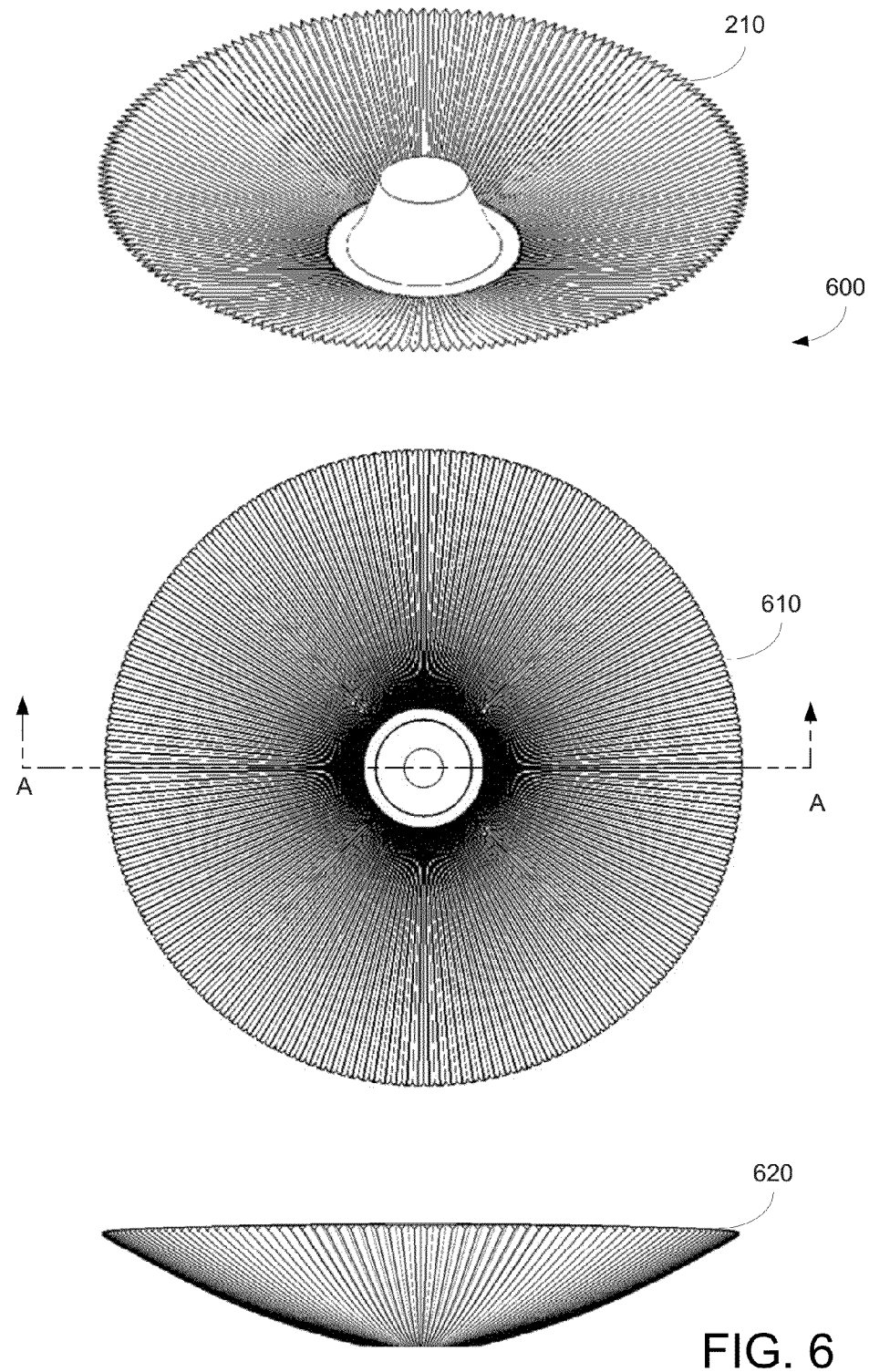

FIGS. 6 and 7 illustrate various views of one embodiment of a reflective lens 600, as mentioned above. More specifically, FIG. 6 includes perspective view 210, a top view 610 and a side view 620 of a reflective lens 600, and FIG. 7 illustrates a close-up view of a cross-section 630 according to various embodiments.

In various embodiments, reflective lens 600 is monolithic and fabricated via a molding process. In other embodiments, reflective lens 600 may be fabricated via a molding and etching process. As discussed above, reflective lens 600 may be formed from a transparent material such as Makrolon™ LED 2045 or LED 2245 polycarbonate available from Bayer Material Science AG. In the various embodiments, a forward-facing side 635 and a rearward-facing side 645 define bounds of the transparent material forming reflective lens 600.

As can be seen in cross-section 630 in FIG. 7, reflective lens 600 includes a body 680 with number of physical regions including a light receiving region 640, a combined light reflecting region and a light output region 650, and a light blending region 660.

Figure 8:
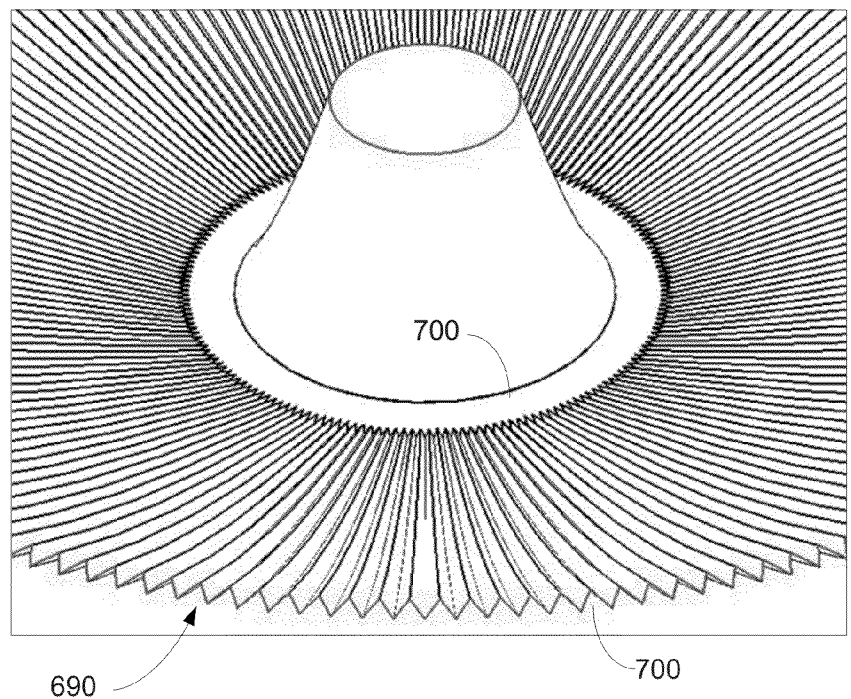
FIG. 8 and FIG. 9 illustrate detailed diagrams according to various embodiments of the present invention.
Figure 9:
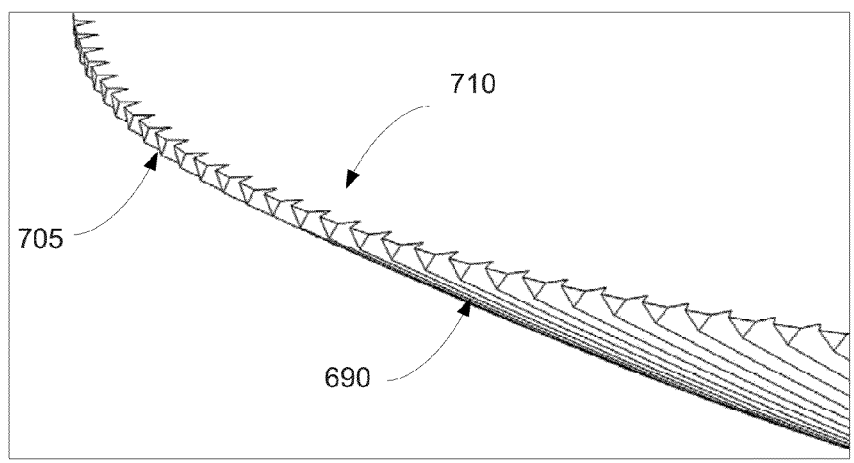

FIGS. 8 and 9 illustrate detailed diagrams according to various embodiments of the present invention. As seen in FIG. 8, in various embodiments, light blending region 660 comprises a plurality of prism structures (e.g., triangular prismatic structures 690). As can be seen, in some embodiments, the prismatic structures 690 begin in an inner region 700 and extend towards an outer perimeter 710 following along the countour of rearward-facing side 645. In other embodiments, prismatic structures 690 may follow other paths along the countour of rearward-facing side 645, such as a spiral pattern, concentric pattern, or the like.

In some embodiments of the present invention, for an MR-16 light source, there are approximately 180 (within a range of 150 to 200) prismatic structures (e.g. each prismatic structure is approximately 2 degrees). Accordingly, at outer perimeter, the pitch between prisms is approximately 0.8 mm (within a range of 0.75 mm to 1 mm) Additionally, the peak to trough depth is approximately 0.4 mm (within a range of 0.3 mm to 0.5 mm). In other embodiments, the number of prismatic structures, the pitches, the depths, or the like may change depending upon specific design.

In some embodiments, an internal angle of the prismatic structures are constant as measured by a tangent line along rearward-facing side 645. In some embodiments, the angles may be slightly less than 90 degrees (e.g., 85, 89, 89.5 degrees, or the like); the angles may be slightly more than 90 degrees (e.g., 90.5, 91, 95 degrees, or the like); or the angles may be approximately 90 degrees.

In some embodiments, the internal angles of the prismatic structures need not be constant, and may be dependent upon a radial distance away from light receiving region. For example, near inner region 700, the angle may be slightly more than 90 degrees (e.g., 91, 95 degrees, or the like), and outer region 710, the angle may be much larger than 90 degrees (e.g., 110, 120 degrees, or the like). In some embodiments, modification of the angle may help reduce or increase hotspots, reduce undesired voids, or modify the beam shape, as desired.

As illustrated in the example in FIG. 9, at outer perimeter 710, prismatic structures 690 may be flattened 705. In various embodiments, this may reduce breakage and facilitate mouting within a heat-sink, as discussed above.

In operation, in various embodiments as illustrated in FIG. 7, an LED source, as described above, provides high intensity light 670 (e.g., light ray 720) to light receiving region 640. In various embodiments, because of an index of refraction mismatch, high intensity light bends within body 680 to form light ray 730. Next, in various embodiments, based upon the index of refraction mismatch, the light ray 730 from the light output region 640 internally reflects (light ray 740) at region 650 within body 680 towards light blending region 660.

In various embodiments, light blending region 660 changes the direction of light ray 740 received from region 650, to generally be directed towards region 650, e.g., light ray 750. Subsequently, at region 650, because of index of refraction mismatch, light ray 750 becomes light ray 760. In the example in FIG. 7, light rays 750 and 760 are dotted, as these light rays are typically not within the same two-dimensional plane as light rays 720, 730, and 740. For example, as illustrated in a top view in FIG. 10, light rays 730 and 740 are shown traversing body 680 within first plane 770. However, when light ray 740 strikes a left leaning prism face 790, it becomes light ray 745 that in turn strikes a right leading prism face 800 and become light ray 750. As can be seen, light ray 745 and 750 shown traversing body 680 within a second plane 780.

Figure 10:
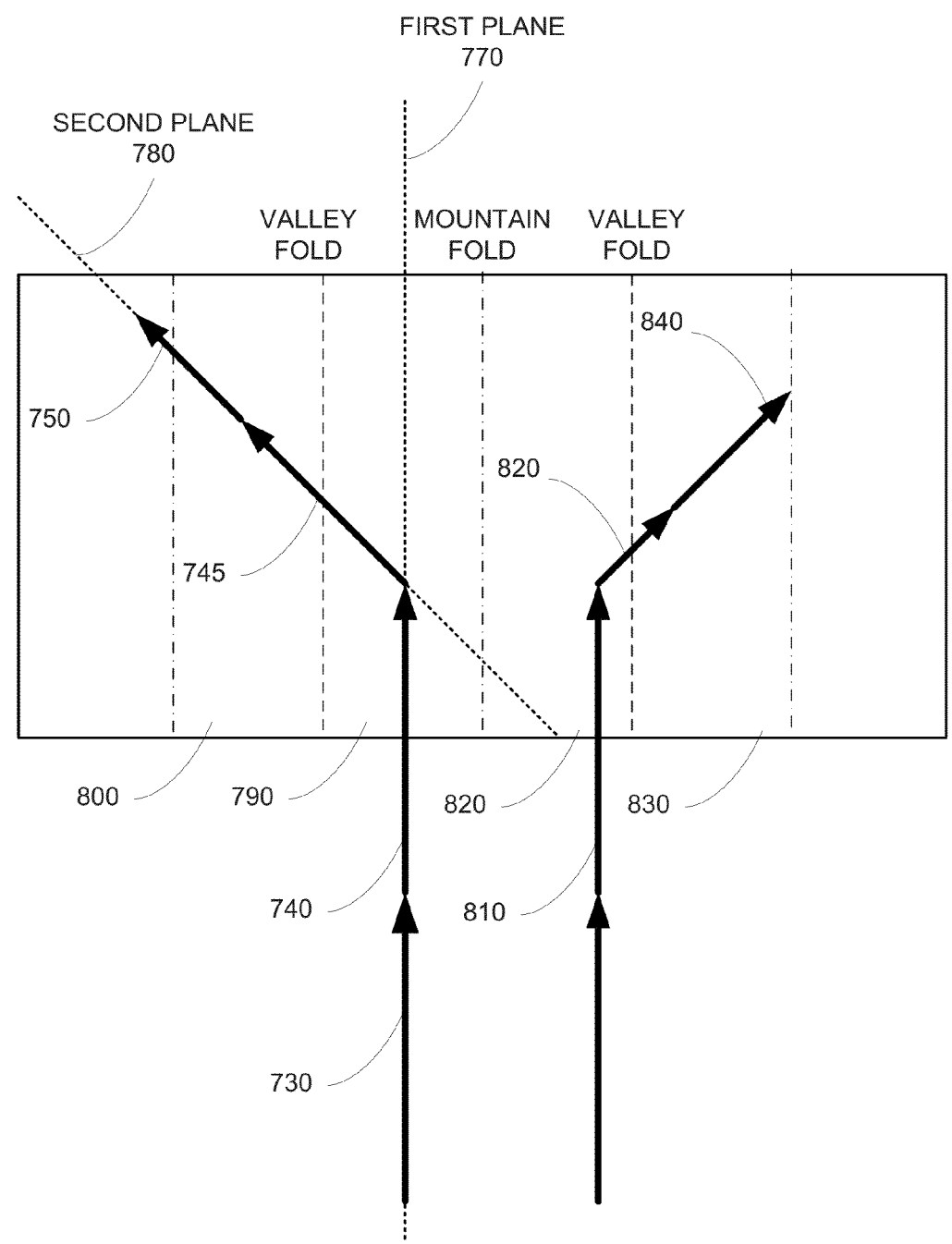
FIG. 10 illustrates an example of redirection of light rays according to various embodiments.

FIG. 10 also illustrates an example of out-of plane redirection of light rays at light blending region 660. In various embodiments of the present invention, as approximately parallel light rays strike the prismatic structures, the light rays are redirected in different directions, depending upon which part of the structures they strike. For example, a first light ray 740 strikes a first portion 790 of a first prismatic structure, bends to the left as light ray 745, strikes a first portion 800 of a second prismatic structure and is directed upwards and to the left as light ray 750 towards region 650. In contrast, a second light ray 810 strikes a second portion 820 of a first prismatic structure, bends to the right as light ray 820, strikes a first portion 830 of a second prismatic structure and directed upwards and to the right as light ray 840 towards region 650. Because the same effect occurs to other light rays that strike the prismatic structures, light that reaches a particular portion of region 650 may be light from different light rays from the high intensity light source. Accordingly, the light rays are blended and output from the reflective lens.

Figure 11:
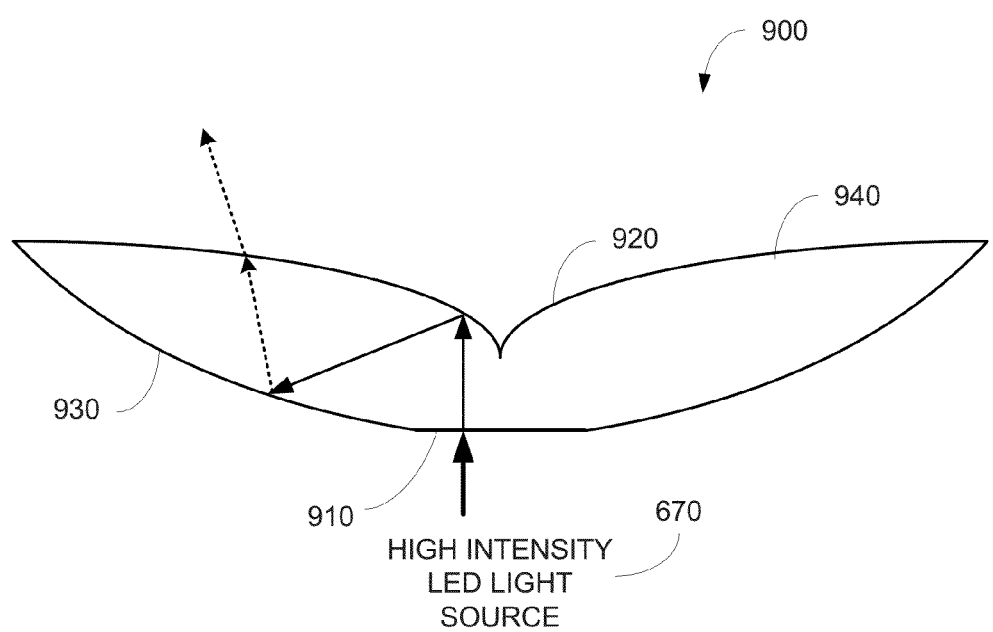
FIG. 11 illustrates a cross-section of another embodiment of the present invention.

FIG. 11 illustrates a cross-section of another embodiment of the present invention. More specifically, a reflective lens 900, including a light receiving region 910, a light reflection region 920, a light blending region 930, and a light output region 940. As discussed above, in various embodiments, light reflection region 920 and light output region 940 may be the same physical surface. As can be seen, light receiving region 910 may be flat, compared to the embodiments illustrated above. Further, it should be understood that the outer perimeter may be flattened similar to flattened 705 region in prismatic structures 690, as desired.

In this example, high intensity light 940 is provided to light receiving region 910. The light enters reflective lens 900 and internally reflects within light reflection region 920. The reflected light strikes the light blending region 930, and as described above, bends the light into a different two-dimensional plane (dotted lines). The blended light is output from light output region 940, as was discussed.

In addition to the aforementioned optics (e.g., TIR lenses), another class of lens is known as a "folded TIR lens". Use of this type of lens allows the diameter of the lens to be larger while reducing the overall height, and thus, for a given form factor of an LED lamp (e.g., an MR-16 form factor) a fan can be included in the inner volume of the lamp without unduly sacrificing certain design objectives such as operating temperature, illumination uniformity, and/or light output efficiency.

In certain embodiments an LED lamps are provided comprising a single LED package light source; a fan; and folded total internal reflection optic s to substantially direct light emitted from the single LED package light source.

Figure 12:
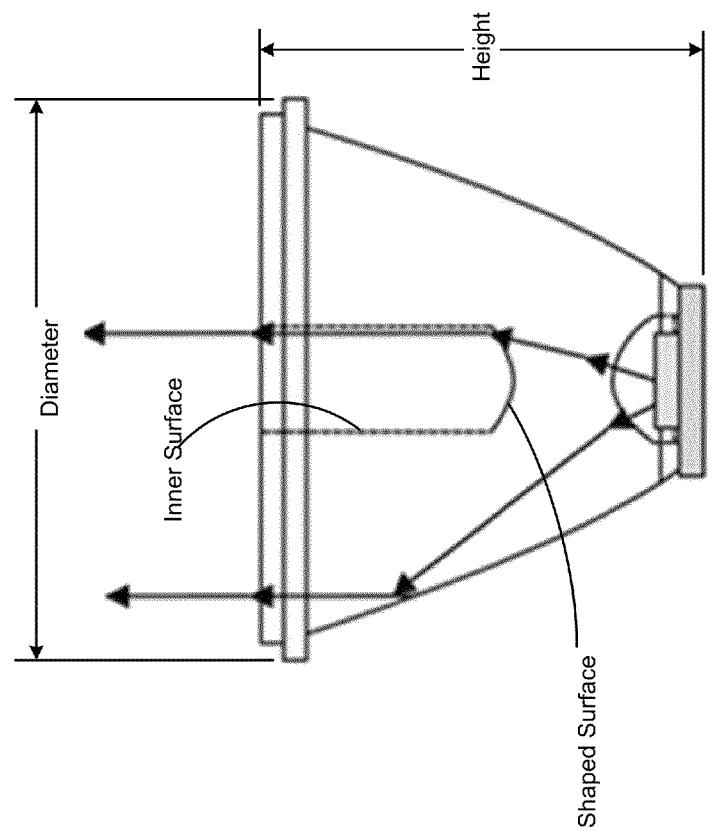
FIG. 12 is a simplified schematic diagram of a lens shape used in some designs for a compact LED lamp with a folded optic proximal to a heat sink and a fan, according to certain embodiments.

FIG. 12 is a simplified schematic diagram of a lens shape 100 used in some designs for a compact LED lamp. As an option, the present lens shape may be implemented in the context of the architecture and functionality of the embodiments described herein.

As shown in FIG. 12, the lamp has a diameter and a height (not necessarily to scale). As indicated, there is an optimal relationship between the diameter of the lens and the height of the lens. The lamp also includes an inner surface of a lens opening and a shaped surface. Light rays (lines with arrows) incident on the inner surface of a lens opening (or on the shaped surface) obey Brewster's law such that, at some angles (a "critical angle" that depends on the index of refraction of the materials), light is not reflected from the incident surface and instead obeys the principles of total internal reflection (TIR). By selecting a shape and juxtaposition so as to control the angle of incidence of the light emitted from the LED and by selecting suitable materials, the light emitted from the LED may be totally internally reflected. Moreover, the shape of the materials can be selected so as to guide light trajectories through a 90-degree angle.

Figure 13:
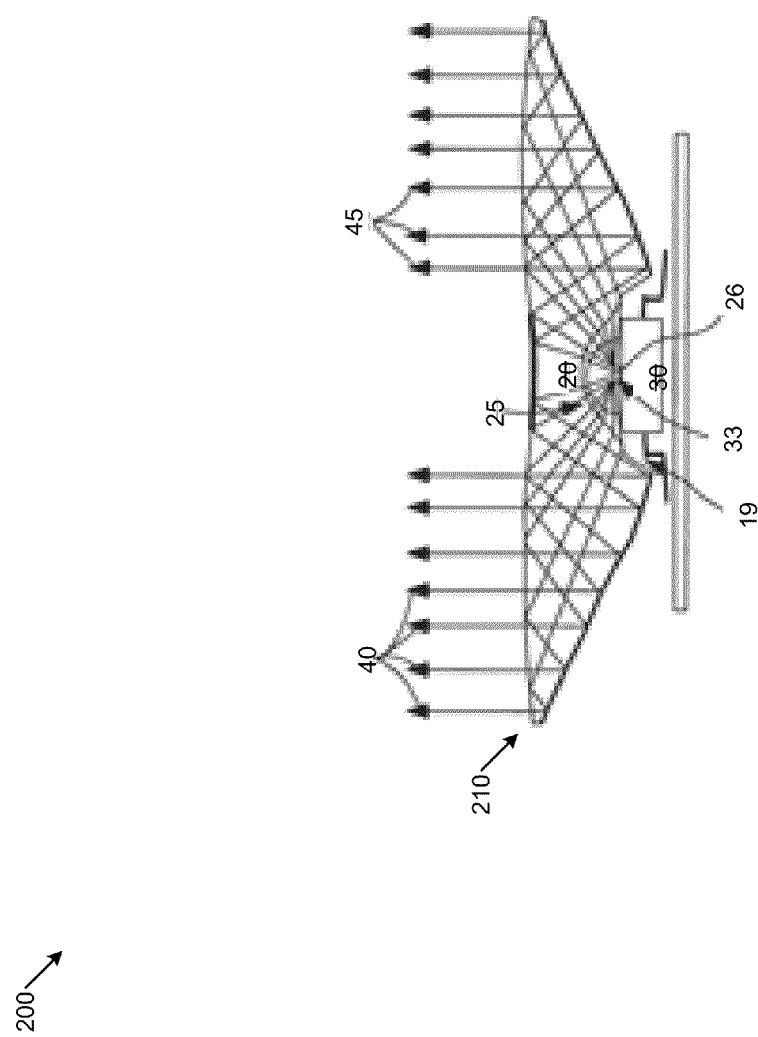
FIG. 13 is a simplified schematic diagram showing TIR ray trajectories in a shallow lens shape used in designs for a compact LED lamp with a folded optic proximal to a heat sink and a fan, according to certain embodiments.

FIG. 13 is a simplified schematic diagram showing TIR ray trajectories in a shallow lens shape 200 used in designs for a compact LED lamp with folded optic 210 proximal to heat sink 30 and fan 19. As an option, the present shallow lens shape 200 may be implemented in the context of the architecture and functionality of the embodiments described herein.

As shown, light originates from a LED package light source 33, which LED package light source 33 is mounted atop a heat sink 30. The light from LED package light source 33 passes through a hemispherical lens 25 such that light is guided in directions so as to be incident on reflector 20. The light trajectory, after striking the reflector 20, is substantially in one direction, as depicted by rays 40 and 45.

Figure 14:
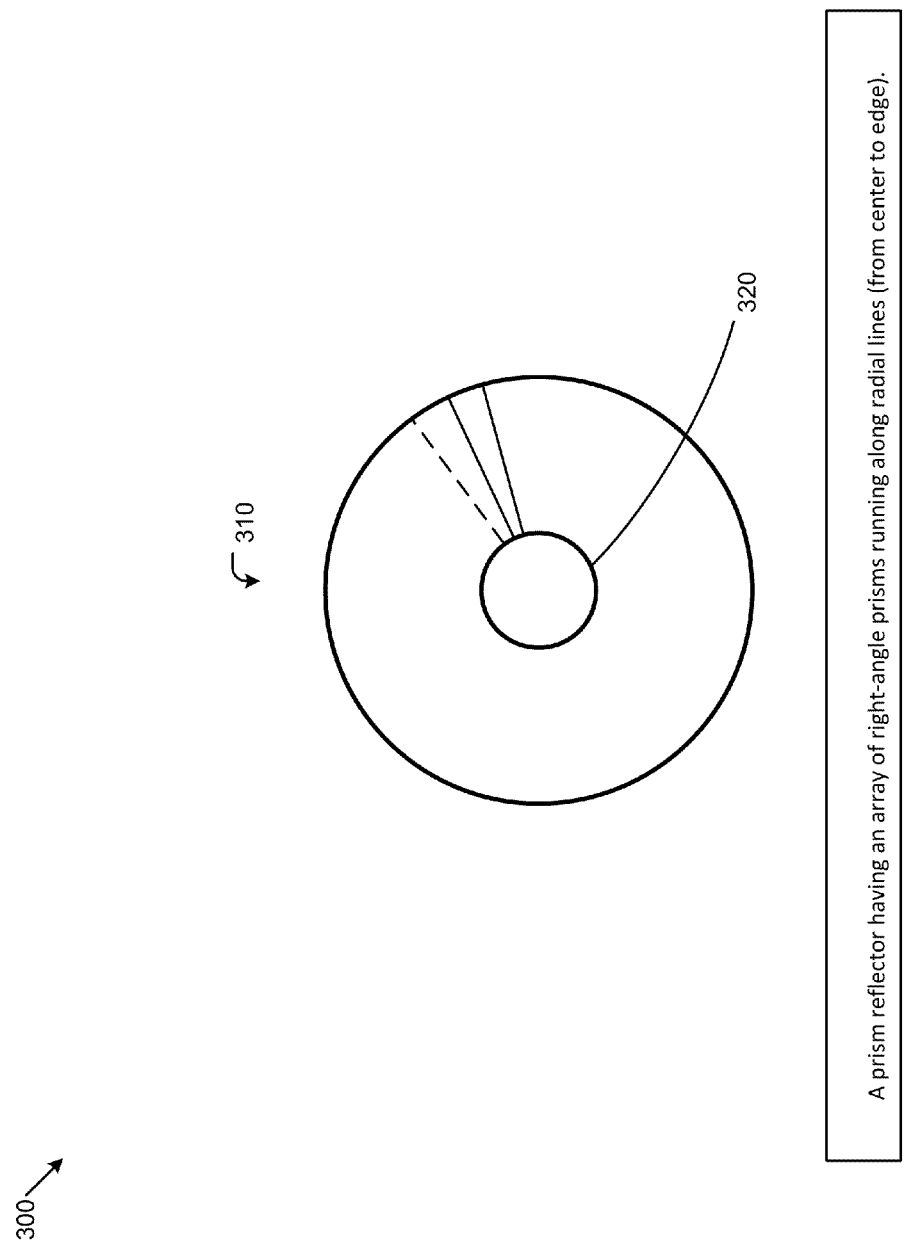
FIG. 14 is a simplified schematic diagram depicting TIR ray trajectories in a folded lens shape, according to certain embodiments.

FIG. 14 is a simplified schematic diagram 300 for describing TIR ray trajectories in a folded lens shape.

As shown, the design of the reflector 310 includes an array of right-angle prisms. The shape of each of the prisms is substantially triangular so they can be disposed in a sidewall-abutted arrangement. As shown, the longitudinal dimensions of the prisms run along the radial lines (from center area 320 to the edge) of the reflector.

Figure 15:
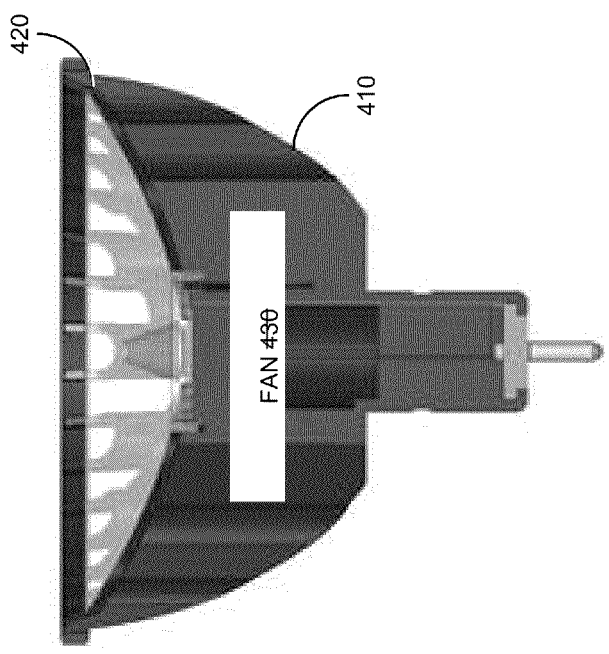
FIG. 15 is a simplified schematic diagram showing an MR-16 form factor lamp having a folded TIR optic proximal to a heat sink and a fan, according to certain embodiments.

FIG. 15 is a simplified schematic diagram showing an MR-16 form factor lamp having a shallow lens shape 400 as used in designs for a compact LED lamp with folded TIR optics 420 proximal to finned heat sink 410 and fan 430. As an option, the present shallow lens shape 400 may be implemented in the context of the architecture and functionality of the embodiments described herein.

Embodiments provided by the present disclosure include method for providing a LED lamp in a compact form factor such as an MR-16 form factor. The methods include combining a single LED package light source and a fan, with a folded optic. The folded optic, which may be a totaling internally reflection optic, to direct light emitted from the single LED package light source. Devices disclosed herein can be combined to provide LED lamps having a small form factor.

In certain embodiments, an LED lamp comprises a single LED package light source; a fan; and a folded optic to substantially direct light emitted from the single LED package light source. In certain embodiments, the LED lamp is provided in a MR16 form factor. In certain embodiments, the folded optic comprises a total internal reflection lens. In certain embodiments, the folded optic is configured to direct light emitted by the single LED package light source in substantially one direction. In certain embodiments, the LED lamp comprises a hemispherical lens disposed adjacent the single LED package light source. In certain embodiments, the LED lamp comprises a reflector disposed on an area of the folded optic such that light emitted by the single LED light source is incident on the reflector. In certain embodiments, the reflector comprises an array of right-angle prisms.

Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope.

What is claimed is:

1. A light-emitting system comprising:
    an LED light source; and
    a lens comprising at least:
        an input region configured to redirect light rays emitted by said LED light source;
        a reflection region configured to reflect by total internal reflection at least a portion of light rays redirected by said input region;
        a prismatic region comprising a plurality of prisms and configured to reflect by two successive total internal reflections at least a portion of light rays being reflected by said reflection region; and an output region configured to emit from said light-emitting system at least a portion of light rays being reflected by said prismatic region.

2. The system of claim 1, wherein a total light output from said LED light source has a non-uniformity, and wherein a total light output emitted from said light-emitting system has an improved non-uniformity.

3. The system of claim 2, wherein said non-uniformity is characterized by a nonuniform intensity.

4. The system of claim 2, wherein said non-uniformity is characterized by a nonuniform color.

5. The system of claim 1, wherein said system emits a directional beam with a beam angle of 10 degrees or less.

6. The system of claim 1, wherein said at least a portion of light rays reflected by said prisms are reflected out of their respective incidence planes.

7. The system of claim 1, wherein said prisms have an apex angles within a range of approximately 89 degrees to approximately 91 degrees.

8. A light-emitting system comprising:
    an LED light source; and
    a lens comprising at least two reflective surfaces configured to reflect by total internal reflection at least a portion of light rays emitted by said LED light source at least three times before said at least a portion of light rays is emitted from said light-emitting system, wherein at least one of said two reflective surfaces has a plurality of prisms configured to reflect at least a portion of light rays by two successive total internal reflections.

9. The system of claim 8, wherein said lens is configured such that all reflections in said lens are by total internal reflection.

10. The system of claim 8, wherein a total light output from said LED light source has a non-uniformity, and wherein a total light output emitted from said light-emitting system has an improved non-uniformity.

11. The system of claim 10, wherein said non-uniformity is characterized by a nonuniform intensity.

12. The system of claim 10, wherein said non-uniformity is characterized by a nonuniform color.

13. The system of claim 8, wherein said system emits a directional beam with a beam angle of 10 degrees or less.

14. The system of claim 8, wherein said plurality of light rays reflected by said prisms are reflected out of their respective incidence planes.

15. The system of claim 8, wherein said prisms have an apex angles within a range of approximately 89 degrees to approximately 91 degrees.

* * * * *